United States Patent [19]

Kratzer

[11] 4,241,792
[45] Dec. 30, 1980

[54] TRACTOR DRAWN GROUND SWEEPER

[76] Inventor: Donald K. Kratzer, P.O. Box 5, Geneseo, Kans. 67444

[21] Appl. No.: 3,267

[22] Filed: Jan. 15, 1979

[51] Int. Cl.³ .............................................. A01D 17/00
[52] U.S. Cl. ..................................... 171/63; 171/124
[58] Field of Search ................................... 171/63–65, 171/110, 124, 126; 198/626

[56] References Cited

U.S. PATENT DOCUMENTS

| | | | |
|---|---|---|---|
| 1,815,087 | 7/1931 | Zuckerman | 171/126 |
| 2,145,786 | 1/1939 | Birkmeyer | 198/626 |
| 2,698,506 | 1/1955 | Rushfeldt | 171/110 |
| 2,852,082 | 9/1958 | Petersen | 171/63 |
| 2,976,936 | 3/1961 | Fry | 171/126 |
| 3,931,881 | 1/1976 | Bickel et al. | 198/626 X |
| 4,014,390 | 3/1977 | Teixeira | 171/124 |

FOREIGN PATENT DOCUMENTS 2657700  6/1977  Fed. Rep. of Germany ............. 171/63

*Primary Examiner*—Robert A. Hafer
*Attorney, Agent, or Firm*—Wm. Jacquet Gribble

[57] ABSTRACT

The ground sweeper has an endless screen movably supported upon a screen carrier which is attached to a wheeled trailer chassis such that the screen run makes an acute angle to the ground. A hydraulic motor powered hydraulically from a hydraulic pump run by the power takeoff unit of the pulling tractor rotates the screen drive roller. Hydraulic cylinders actuate a pivotally mounted rear hopper such that it may be hydraulically tilted to dump its load from the screen on the ground. The trailer ground sweeper carries its own hydraulic fluid tank and its hydraulic system has controls operable from the driver's position on the drawing tractor. A scoop at the front of the sweeper adjacent the lowest portion of the moving screen has a scoop blade which is reversible with respect to the run of the belt, such that the blade may be reversed to maintain a keen edge. Preferably the front or lower screen roller is combined with a rock auger such that solid debris coming through the screen may be transversely removed from between the runs of the screen.

9 Claims, 9 Drawing Figures

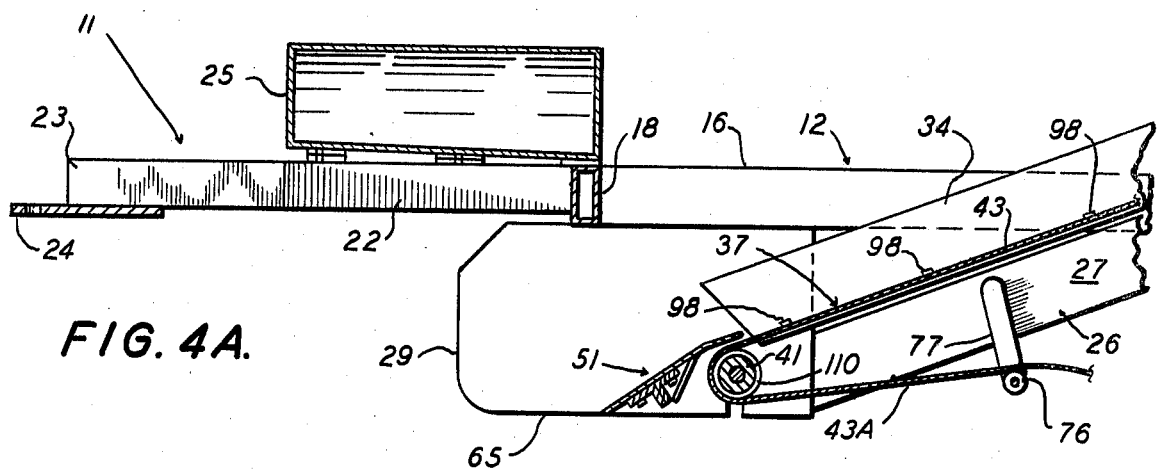
FIG. 4A.
FIG. 5.
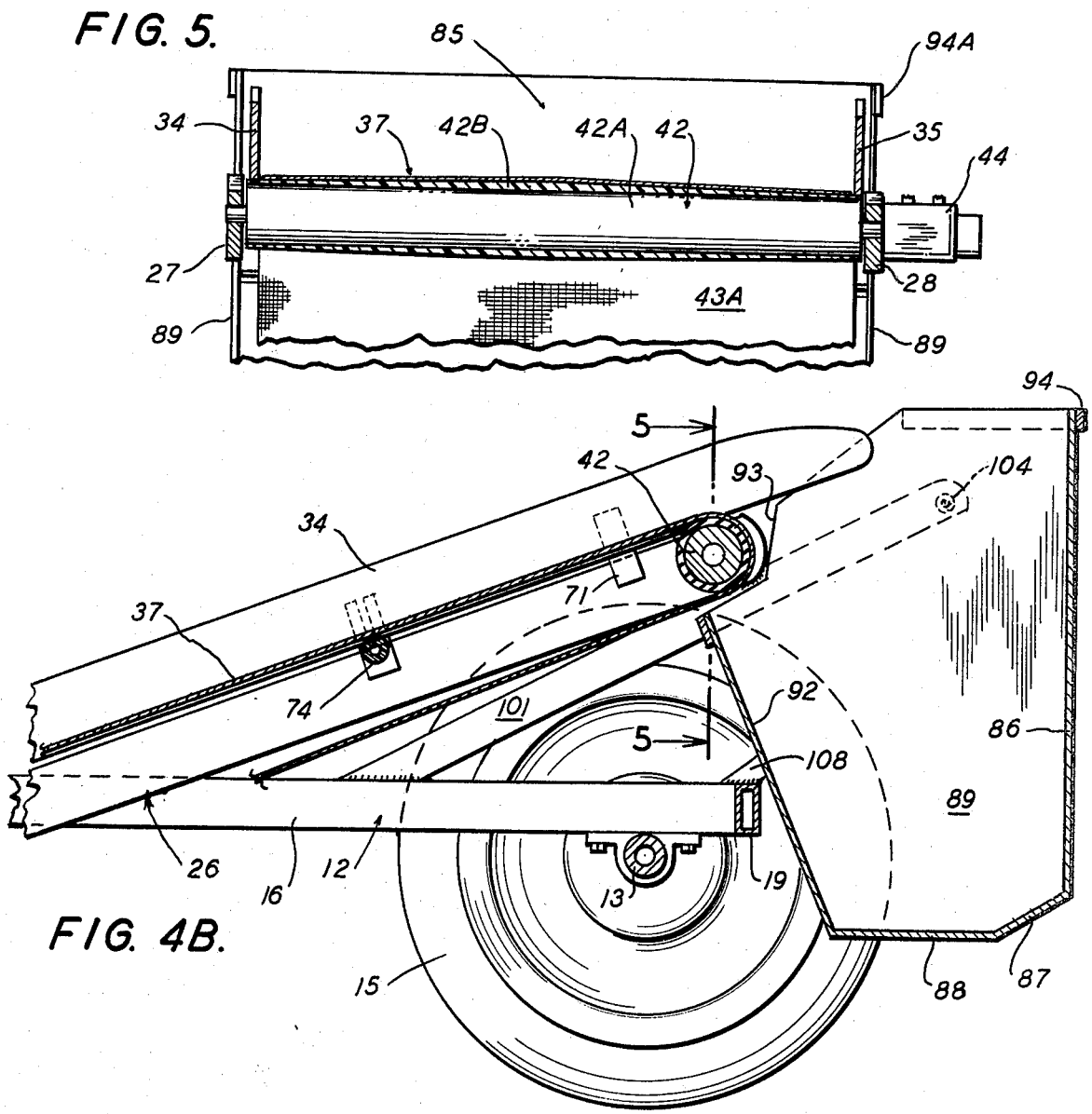
FIG. 4B.

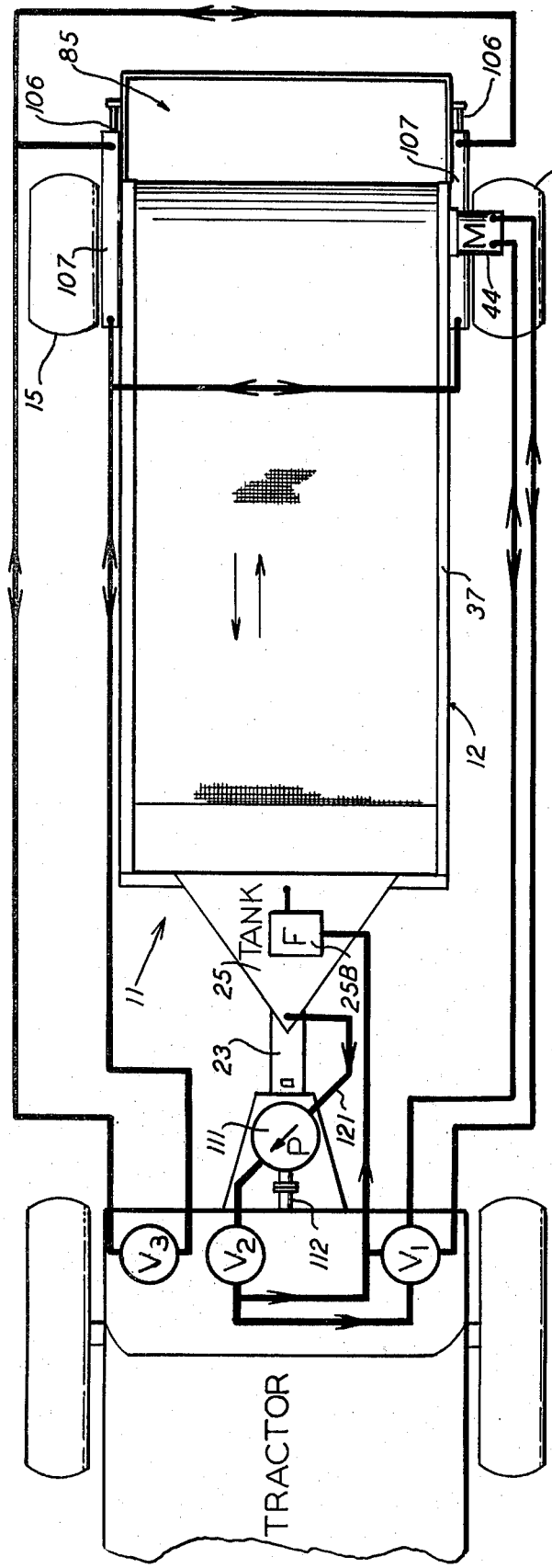
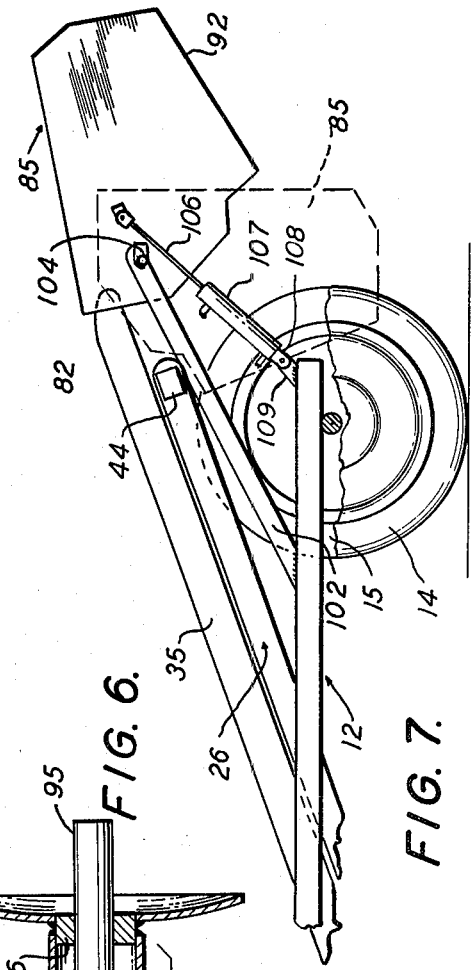
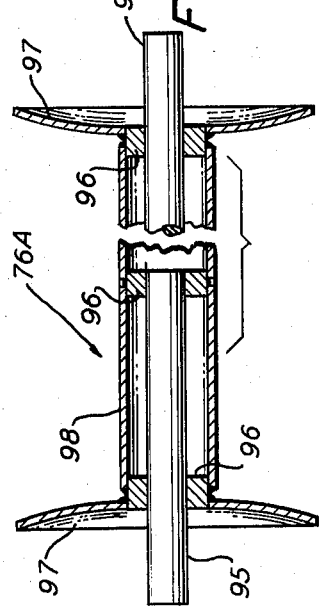
FIG. 8.
FIG. 6.
FIG. 7.

TRACTOR DRAWN GROUND SWEEPER

BACKGROUND OF THE INVENTION

The invention relates to ground sweepers of the type used to clean beaches of solid debris and to remove rocks from dirt tracks. In either case the ground contour is irregular and it is difficult to maintain rigid drive units because of the continuing change in attitude between the tractor vehicle and the sweeper itself. In addition the conventional relatively steep pitch of the moving screen of ground sweepers has shortened the effective run of the screen for the purpose of separating large and small solids.

The present invention eliminates rigid drive coupling between the drawing vehicle and the trailing ground sweeper and substitutes sensitive controls for the gross controls of previous tractor-trailer combinations. These advantages are achieved by utilizing hydraulic controls and drives on the trailing vehicle coupled to the drawing vehicle by flexible hydraulic lines connecting to a hydraulic pump driven from the power takeoff unit of the tractor, the pump being fixed to the tractor. Since the conventional tractor has both a hydraulic system and a power takeoff shaft as standard equipment, any tractor of sufficient power can be coupled easily to the ground sweeper of the invention and all of the functions of the sweeper controlled from the driver's seat.

SUMMARY OF THE INVENTION

The invention contemplates a ground sweeper to be towed behind a conventional power tractor equipped with a hydraulic system and a power takeoff shaft and comprises a frame with outboard wheels near the rear of the frame and a forward tow bar for connection to the tractor. A hydraulic fluid storage tank is on the frame and the frame supports a movable screen carrier which supports transverse screen rollers, one at the front and one at the rear of the carrier. A moving endless screen is supported on the rollers and a hydraulic motor on the carrier drives a roller to move the screen longitudinally of the sweeper. A rear hopper receives sweepings from the moving screen and the hopper is mounted to the sweeper such that hydraulic means operable from the tractor may invert the hopper to dump collected sweepings on the ground.

Preferably a transverse scoop at the front of the sweeper ahead of the moving screen has a sharp leading edge and a sharp trailing edge and is mounted such that the scoop may be reversed to renew the leading edge. A hydraulic pump carried by the tractor is operably connected to the power takeoff of the tractor. Hydraulic lines connect the pump to the hopper inversion means and to the removable screen motor. Preferably controls on the tractor itself control the flow of actuating hydraulic fluid to and from the hopper inversion means and the screen motor. In a preferred embodiment the forward idling screen roller is combined with a rock auger for side dumping of debris.

A sweeper in accordance with the invention is adapted to use on uneven terrain and in loose soil or sand and is most efficient in separating solids from the loose soil and may conveniently dump the collect undesirable solids at any selected point on the ground, needing no auxiliary equipment for handling the hopper.

These and other advantages of the invention are apparent from the following detailed description of the drawing.

BRIEF DESCRIPTION OF THE DRAWING

FIGS. 4A and 4B are respectively fragemtary longitudinal sectional elevations of the forward and rearward portions of the sweeper of the invention;

FIG. 5 is a fragmentary transverse sectional elevation taken along line 5—5 of FIG. 4B;

FIG. 6 is an enlarged fragmentary sectional elevation of a preferred screen roller;

FIG. 7 is a schematic side elevation, partly broken away, showing the operation of the debris hopper; and FIG. 8 is a diagram of the sweeper hydraulic system.

In the various views like reference numerals are used to identify like parts.

DESCRIPTION OF THE PREFERRED EMBODIMENTS

Figure 1:
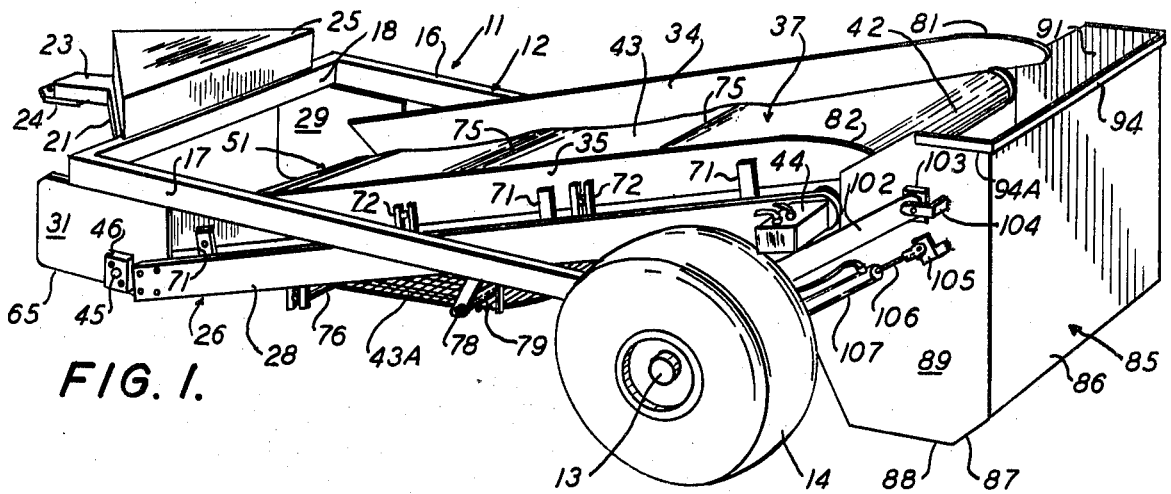
FIG. 1 is a side perspective view of a ground sweeper in accordance with the invention.

In FIG. 1 a ground sweeper 11 has a substantially horizontal chassis or frame 12 supported on an axle 13 mounting right and left wheels 14, 15. The chassis has side rails 16, 17, a front transverse beam 18 and a rear transverse beam 19 (see FIG. 4B). Two forwardly converging bars 21, 22 are fixed to and extend from beam 18 and terminate in a tongue 23 at the forward end having a coupler plate 24 for coupling to a tractor to pull the ground sweeper.

A screen carrier 26 is supported by frame 12 and extends at an acute angle thereto and to the ground from front to rear. The carrier has side beams 27, 28 which are fixed forwardly to transversely separated side plates 29, 31 which in turn depend from side rails 16, 17 respectively, of the trailer frame. A hydraulic fluid tank 25 is fixed to the frame and extends forward of beam 18 on top of converging members 21, 22.

Each carrier side beam 27, 28 supports a longitudinal retainer 34, 35 respectively. The retainers confine a moving endless screen 37 which moves longitudinally of the sweeper between a front idler roller 41 (FIG. 3) and a rear driven roller 42 (FIG. 4B), in an upper run 43 and a lower run 43A. A hydraulic motor 44 (in FIG. 1) powers driven roller 42. A shaft 45 for front roller 41 is journalled in outboard journal bearings 46 fixed one to each of the side plates 29 or 31 as again shown in FIG. 1.

Figure 2:
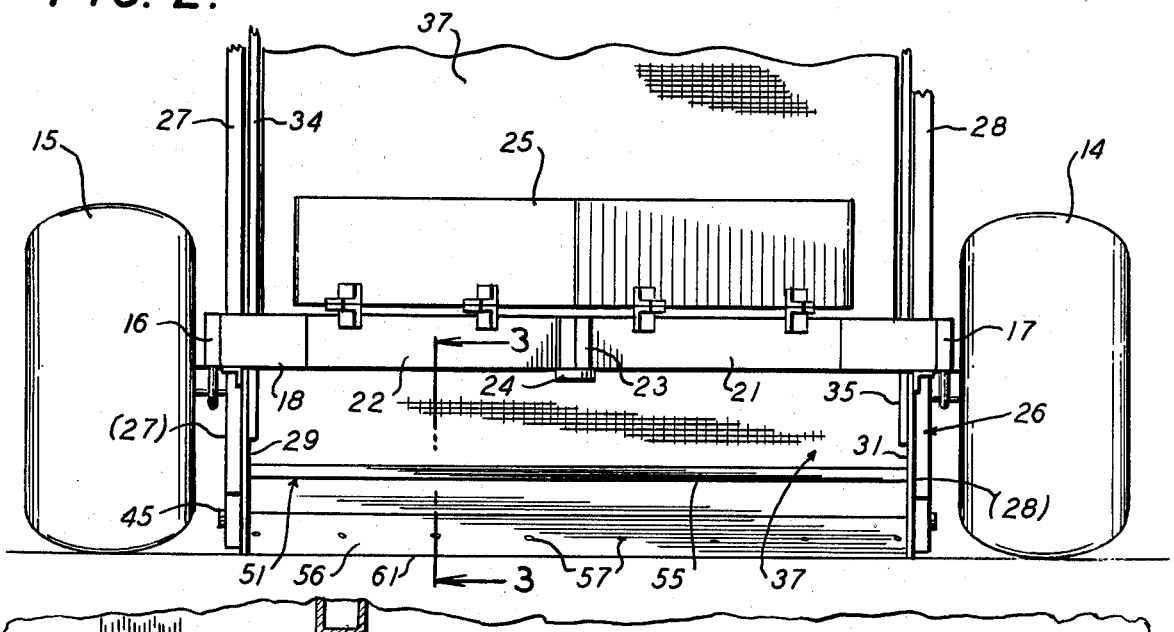
FIG. 2 is an enlarged front elevation of the embodiment of FIG. 1.
Figure 3:
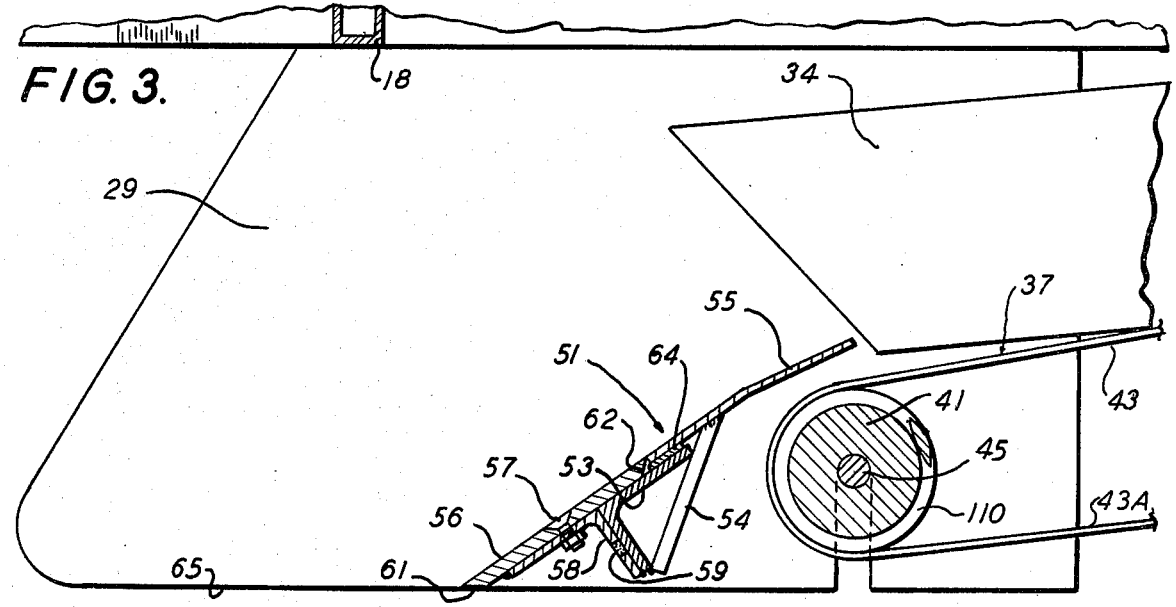
FIG. 3 is a fragmentary longitudinal sectional elevation taken along line 3—3 of FIG. 2.

The side plates also support a front scoop assembly 51 (shown in FIGS. 2 and 3) at a trailing angle of 30°-40° to the ground. The scoop extends between the plates 29, 31 supported by a first transverse angle iron 53 and a plurality of transversely spaced baffle support plates 54. As seen in FIG. 3 the baffle support plates hold a transverse scoop baffle 55 immediately behind a reversible scoop blade 56. The scoop blade is secured by bolts 57 to a second transverse angle iron 58 secured by welding plugs 59 to the first transverse angle iron 53. The bolts 57 are placed longitudinally centrally of the scoop blade such that either of the sharp edge portions 61, 62 of the scoop blade may be oriented downwardly so that a sharp edge may always be presented to the ground being swept. The leading edge of the scoop baffle may be reinforced by a transverse spacer bar 64 if desired. The sharp leading edge of the scoop is in the same plane as the bottom surface 65 of both side plates.

As can be seen from FIG. 1, retainers 34,35 are supported by carrier 26 by a plurality of upwardly extending, longitudinally spaced, holders 71. In addition to the holders, two or more bifurcated journals 72 extend upwardly from each of the carrier side beams 27, 28 to hold support rollers like the roller 74 shown in section in FIG. 4B and indicated in FIG. 1 by the raised zones 75 of screen 37. Rear holder 71 may journal a screen support roller.

On return run 43A of the screen a forward support roller 76 is supported by depending arms 77 fixed to and depending below side beams 27, 28 on each side of the carrier. A tensioning roller 78, indicated in part in FIG. 1, is biased by a spring 79. Alternatively the roller may be a weighted one and the tensioning bias be gravitational, rather than spring tension.

The trailing ends of retainers 34, 35 are tapered at 81, 82, respectively, to accommodate the upward tilted position of a collection hopper 85 into which the collected sweepings or debris from screen 37 are discharged. The hopper has a back wall 86 which extends transversely at the rear of the sweeper and acts as a sweepings baffle. A sloping bottom portion 87 blends with a substantially horizontal bottom panel 88 which in turn is joined to hopper side panels 89, 91 and a forwardly sloping front wall 92. Front wall 92 has a lesser height than back hopper wall 86 and acts to confine received debris and also acts as a load skid ramp for contained trash when the hopper is dumped (FIG. 7). The side walls are stepped at 93 to clear the adjacent portions of the moving screen over rear drive roller 42. The upper edges of the hopper are braced by bars such as the bars 94, 94A. The hopper may be additionally braced in conventional fashion by straps and angles (not shown) but such bracing forms no part of the invention and is therefore not detailed.

Hydraulic motor 44 is directly connected to drive roller 42. As stated before, the motor is fixed to carrier side beam 28 and driven from a hydraulic pump 111 fixed to the tractor. The pump and other elements of the hydraulic system are described later in conjunction with the description of FIG. 8.

Preferably the drive roller 42 comprises a metallic elongate cylinder 42A (see FIG. 5) and a resilient sleeve 42B. The sleeve has a greater diameter near the center of the roller and the diameter diminishes from the center to the outer edges of the roller adjacent retainers 34, 35. The sleeve is preferably of rubber of 60 Durometer hardness and density for durability and sufficient drive friction to maintain the endless screen 37 in position on the roller and between the retainers 34, 35.

In a preferred form of the invention guide rollers 76A, may additionally maintain screen position by edge-guiding the screen. A guide roller 76A is fragmentarily shown in FIG. 6 with axle stubs 95 fixed in roller discs 96 at each end of the roller. End bell flanges 97 are fixed to the roller discs which reside in a roller tube 98. Each roller may be a welded assembly with the bell flanges asserting a centering force on the moving screen. The roller 76A may replace forward support roller 76 with the axle stubs journalled in arms 77. A second guide roller 76A may be journalled in rear holders 71 between driven roller 42 and support roller 74.

Because the ground sweeper of the invention is in motion in use, some racking of the chassis or frame and carrier may take place. Therefore it is desired that the screen have edge rub bars like the bars 98 of FIG. 4A which are fixed to the upper surface of screen 37 and contact retainers 34, 35 to maintain the edges of the screen. The invention does not preclude using hold-down rails on the interior surfaces of the retainers, to further stabilize the travel of the screen in its path around rollers 41 and 42. Such rails are not shown and may not be needed. Screen cleaning brushes and conventional screen vibrators also may be used.

The hopper 85 is pivotably mounted on rearwardly and upwardly extending cantilever bars 101, 102, with bar 102 showing in FIGS. 1 and 6 while bar 101 shows in the longitudinal section of of FIG. 4B. The bars are anchored to an upper edge portion of side rails 16, 17 as by welding. Each bar has an upper rear end that mounts a pivot pad 103 to which a bracket 104 of the hopper is pivotably connected. Below and adjacent to each bracket 104 is a cylinder rod anchor 105. A piston rod 106 of each of two hydraulic lift cylinders 107 is pivotably secured to a rod anchor. There is a cylinder 107 adjacent each side of the hopper and the base 108 of each cylinder is fixed to a mounting bracket 109 at the rear end portion of each side rail of the frame 12. The cantilever bar and hydraulic cylinder arrangement is best seen in FIG. 7 where the hopper 85 is shown in dumping position with the front wall 92 at an abrupt angle to the ground such that sweepings and debris collected by the hopper slide along the front wall to the ground readily from the hopper and are deposited to the rear of the sweeper wheels 14, 15. The rod 106 of the visible cylinder 107 is shown extended, extension having caused the hopper to revolve about pivot pad 103 into the dumping position of FIG. 6.

For beach sweeping it has been found that a rock auger 110 combined with front screen roller 41 affords efficient disposal of small solids which penetrate the top run of the screen but may not fall through bottom run 43A of the screen. A rock auger five inches (12.7 cm) in diameter has been found sufficient for most beach sweeping and avoids the problem which a larger roller causes, mainly elevation of the forward end of the endless screen, thereby increasing the profile of the screen to an undesired excessive height. The angle of the screen to the longitudinal extent of the sweeper may be from 15 to 25 degress, with 20 degrees being the preferred attitude of screen and screen carrier.

As mentioned previously, scoop assembly 51 forms a loading ramp at an acute angle to the ground. While the desired angle may vary with work conditions between 30° and 40°, the optimum angle for scoop loading is 35°. Empirical testing under many working conditions has demonstrated a 35° degree trailing angle permits higher ground speed and smooth materials flow to the moving screen.

For use on sand the sweeper may have gross weight behind the tractor of 5,500 pounds (2,275 kg.), including the fluid load. With such a weight it has been found that the 18.4×16A tires inflated to about 25 psi (1.7) work efficiently on most beach sands. The total width, including the wheels may be a little less than ten feet (3 m.) to make it highway portable, while the length of 21 feet (6.4 m.) including the hopper, is sufficient to accommodate the desired screen angle of twenty degrees for most efficient screening.

It may be desirable to have brushes transversely of the screen next to the retainers and in some situations sand wetness may dictate use of mechanically driven shakers or screen vibrators, as mentioned above.

The hopper preferably has a capacity of 2.0 cubic yards (1.51 cu.m.) which allows long periods of operation without cessation to seek a dump site. The hydraulic tank 25 has a capacity of 30 gallons (113.7 liters) and the pressure to drive motor from the pump is about 1,500 psi. With such a pressure the hydraulic system shown schematically in FIG. 8 is capable of keeping the screen running at the desired linear feet per minute while the periodic energization of the hydraulic cylinders 107 which invert hopper 85 to dump the collected debris is derived from the tractor hydraulic system.

As can be seen from FIG. 8 a pump 111 fixed to the tractor is driven from the conventional power take-off shaft 112 of the tractor. The pump circulates fluid under pressure to and from tank 25, returning fluid through a tank filter 25B.

The tractor carries a series of fluid valves $V_1$, $V_2$, and $V_3$. Valves $V_1$ and $V_2$ control flow from the tractor-mounted pump to the motor and to the sweeper fluid tank. Valve $V_3$ controls flow from the tractor hydraulic system to the cylinders 107 which are adapted to invert the hopper for dumping. It is apparent from the diagram that the motor 44 is reversible should reverse motion of the endless screen be needed to clean it or unclog it. The pump supply line 121 taps the front of the tank and runs through the pump to valve $V_2$ and then returns to the tank and in parallel with the valve $V_1$. Valve $V_1$ can be used to shunt the fluid back to the tank or to either side of the motor 44 depending upon the rotation direction desired.

It is apparent that the tractor operator, from his driving seat, may control the hydraulic actuation of the sweeper operation. In addition to this advantage, the tractor operator may regulate screen speed and direction from the tractor as dictated by direct visual observation of the sweeper operation. The sweeper is capable of following the tractor across many types of rough terrain because no rigid drive shaft is needed by the sweeper of the invention between it and the tractor.

No particular tractor is required for the sweeper of the invention, the towing vehicle needing only a place to affix the hydraulic pump where it may be coupled to the P T O and the addition of a control valve panel near the driver. Valves and supply lines are all conventional. The inventive sweeper also has the advantage of simple dumping from an articulated hopper to the ground, needing no accessory tools or vehicles.

The ground sweeper of the invention thereby affords a device that requires only a single operator yet is versatile in terms of work it can accomplish and terrain to which it accommodates.

While the illustrative descriptive material above sets forth some variations within the scope of the invention, other such variations will occur to those skilled in this particular art. It is therefore desired that the invention be measured by the appended claims to invention rather than by the foregoing exemplary disclosure.

I claim:

1. A ground sweeper to be towed behind a conventional hydraulically equipped and power take-off equipped power tractor and comprising a frame, outboard wheels journalled to the frame near the rear of the frame, a frame towbar tongue, a hydraulic fluid storage tank on the frame at the juncture of the frame and tongue; a moving screen carrier supported by the frame at an acute angle to the horizontal extent thereof and rising from tongue to wheels, transverse screen rollers at front and rear of the carrier, a moving endless screen supported from said screen carrier on said rollers, a hydraulic motor on said carrier adapted to drive said moving screen to run from rear to front of said sweeper, a hopper to receive sweepings from said moving screen, hopper mounts on said frame adapted to invert said hopper for dumping collected sweepings on the ground, frame mounted hydraulic means for actuating the inversion of said hopper; a transverse scoop removably fixed to said carrier at the front of said sweeper at a trailing vertical angle to the path of said sweeper, side plows at each side of said scoop extending in vertical plane along the path of said sweeper and supported by said frame; a hydraulic pump adapted to be carried by said towing tractor and further adapted to be connected operationally to said power take-off of the tractor, hydraulic lines from the hydraulic pump to the screen motor, hydraulic lines from the tractor hydraulic equipment to the hopper inversion means, and controls adapted to be mounted on said tractor to control flow of actuating hydraulic fluid to and from said hopper inversion means and said screen motor.

2. A sweeper in accordance with claim 1 further comprising an auger at the front of said endless screen combined with said front transverse screen roller for side-dumping of debris between screen runs.

3. A sweeper in accordance with claim 1 wherein the acute vertical angle of said screen carrier and said screen is approximately twenty degrees of the horizontal extent of said sweeper.

4. A sweeper in accordance with claim 1 wherein said scoop blade has front and rear edges each adapted to be front edges, and mount means adapted to reverse the mounting of the scoop blade with respect to the side plows and the run of the moving screen.

5. A sweeper in accordance with claim 4 wherein said scoop mount means secure the scoop blade at an trailing angle of about 35° with respect to the ground support of the sweeper.

6. A sweeper in accordance with claim 1 wherein said rear screen roller is a driven roller.

7. A sweeper in accordance with claim 6 wherein said rear roller comprises a metallic cylinder, and a resilient sleeve on said cylinder, said sleeve having an extent as great as the cylinder and a greater diameter at its transverse midpoint than the diameter at either end of the sleeve.

8. A sweeper in accordance with claim 6 further comprising a transversely disposed flanged guide roller between screen runs forward of the driven roller.

9. A sweeper in accordance with claim 8 further comprising a transversely disposed flange guide roller below the normal return run of the moving screen and rearward of said front transverse screen roller.

* * * * *